United States Patent [19]
Nagano

[11] Patent Number: 4,659,193
[45] Date of Patent: Apr. 21, 1987

[54] EPIDARK ILLUMINATION DEVICE

[75] Inventor: Takashi Nagano, Hachiouji, Japan

[73] Assignee: Olympus Optical Co., Ltd., Tokyo, Japan

[21] Appl. No.: 663,698

[22] Filed: Oct. 22, 1984

[30] Foreign Application Priority Data

Oct. 24, 1983 [JP] Japan .................................. 58-198821

[51] Int. Cl.⁴ .......................... G02B 21/10; G02B 5/10
[52] U.S. Cl. .................................... 350/525; 350/321; 350/600
[58] Field of Search ................................ 350/523–528, 350/321–322, 168, 600

[56] References Cited
U.S. PATENT DOCUMENTS 2,415,732  2/1947  Domingo ............................ 350/525
2,809,554  10/1957  Bernhardt .......................... 350/525
4,351,584  9/1982  Chandesais ........................ 350/523

FOREIGN PATENT DOCUMENTS 593228  2/1934  Fed. Rep. of Germany .
975784  9/1962  Fed. Rep. of Germany .

OTHER PUBLICATIONS

Hooff, et al., "Description of a Dark-Field Illuminator Cone for Dissecting Microscope", Microscopica Acta., vol. 85, #1, 9-1981, pp. 17-18.

Primary Examiner—William H. Punter
Attorney, Agent, or Firm—Cushman, Darby & Cushman

[57] ABSTRACT

An epidark illumination device comprising an optical means whereby a light from a light source is rightly reflected within an entrance plane including an optical axis but is diffused within a plane vertical to the entering plane, a light interrupting plate preventing the light from the light source from directly entering an objective and an iris diaphragm provided near an object to be inspected so as to make a uniform epidark illumination possible and to prevent a stray light from entering an observing optical system.

8 Claims, 10 Drawing Figures

EPIDARK ILLUMINATION DEVICE

BACKGROUND OF THE INVENTION (a) Field of the invention

This invention relates to an epidark illumination device whereby, in observing an object to be inspected having a light transmissibility but including impurities or optically anisotropic substances with such observing optical system as a stereomicroscope, a dark background part is made on the object by preventing an illuminating light from directly entering the observing optical system so that only the light diffused by the object of the illuminating light can be observed.

(b) Description of the prior art

There is known a conventional epidark illumination device of this kind whereby, as mentioned, for example, in Japanese Patent Laid-Open No. 140811/1980, a light from a light source is made annular by a light guiding member made of known glass fibers and the light coming out of the exit end face of the guiding member is reflected by an annular reflecting face to illuminate an object to be inspected. As shown in FIG. 1, this is formed of a light source 1, a light guiding member 2 made of a known glass fiber bundle and having the entrance end 2a near the light source 1 formed to be bar-shaped and the exit end 2b formed to be annular and a reflector 3 arranged concentrically on the exit end 2b and having a conical reflecting face 3a so that the light emitted from the light source 1 will be transmitted through the light guiding member 2 to become an annular light and then will be reflected by the conical reflecting face to be collected in the direction of an object 4 to be inspected. In order to minimize the reflection of the ground surface of the object 4 to be inspected, the conical reflecting face 3a has been formed of a rough surface so that the reflected light may be diffused. There has been also an example in which, in order to increase this diffusing effect, as shown in FIG. 2, a glass mat 5 is placed on the reflector 3.

However, there has been a problem that, in the example shown in FIG. 1, in order to effectively illuminate the object 4 to be inspected, it is necessary to set the angle of inclination of the conical reflecting face 3a so that most of the light coming out of the exit end face 2b may enter the object 4 but, if the angle of inclination of the conical reflecting face 3a is so set, as the reflecting face 3a is of a rough surface, a part of the diffused illuminating light will directly enter the observing optical system and the epidark effect will be greatly reduced. There has been also a problem that, if the conical reflecting face 3a is formed of a mirror surface, the annular illuminating light will be collected in the central part by the action of the reflector 3 so as to form a bright spot and an unflat illumination will be likely to be made.

There has been also a problem that, even in the example shown in FIG. 2, a part of the illuminating light reflected by the conical reflecting face 3a and diffused by the glass mat 5 will be likely to enter the observing optical system to reduce the epidark effect.

Therefore, in order to interrupt such stray light as is caused by diffusion, as mentioned, for example, in Japanese Utility Model Publication No. 11051/1970, it has been invented to provide a light interrupting cylinder which will not interrupt the illuminating light that will interrupt only the stray light above a frosted plate bearing frame in a dark illumination device wherein a light source is arranged in the center of a reflector, a frosted plate (frosted glass plate) is provided just above the light source and an iris diaphragm is provided near window for illuminating the object to be inspected. As shown in FIG. 3, this is formed of a housing 10, a cylinder body 11 fixed to the housing 10 and having reflecting mirror surface 11a, a light source 13 positioned in the central part of the reflecting mirror surface 11a and fixed to the bottom of the cylinder body 11 through a supporting frame 12, a bearing frame 15 positioned just above the light source 13 and fixed to the cylinder body 11 through an arm 14, a frosted plate 16 fixed to the bearing frame 15, a shutter plate 17 provided just above the frosted plate 16 so as to be free to open and close and opened and closed with a shutter lever 17a projected out of the cylinder body 11, a light interrupting cylinder 18 for preventing stray lights formed integrally with the bearing frame 15 so as to extend above the bearing frame 15, a lid 19 fixed to the top part of the housing 10 and having an opening 19a concentric with the center axis O of the light path, an iris diaphragm 20 arranged just below the opening 19a and operated with a handle 20a, a bowl-shaped frosted plate 21 positioned just below the iris diaphragm 20, fitting to the light interrupting cylinder 18 and fixed to the lid 19, a supporting rod 23 fixed on the lid 19 and having a holder 23a for holding the object 22 to be inspected and a connecting bar 24 connecting the entire illumination device with a microscope body not illustrated. By the way, the curved surface of the above mentioned bowl-shaped frosted plate 21 is made such surface on which the light bundle reflected by the reflecting mirror surface 11a will be incident substantially vertically to reduce the light amount reflected by said surface to be as small as possible. Therefore, if the frost of the bowl-shaped frosted plate 21 is of fine grains, the direction of the light having been transmitted through the bowl-shaped frosted plate 21 will be substantially kept. The reference numeral 25 denotes an objective of the observing optical system.

The light emitted from the light source 13 will be reflected by the reflecting mirror surface 11a and will be substantially vertically incident on the surface of the bowl-shaped frosted plate 21 to illuminate the object 22 to be inspected, only the light diffused by the object will enter the objective 25 and therefore only the object has been observed as brightly floated up in the dark visual field. In this case, needless to say, as the shutter plate 17 is closed, the light just above the light source 13 will be interrupted. Also, the stray light produced when the light bundle led by the reflecting mirror surface 11a or the light transmitted through the bowl-shaped frosted plate 21 is diffused by the surrounding wall plate or the like will be interrupted by the light interrupting cylinder 18.

However, there has been a problem that, in the case of this example, as the off-axis illumination is prevented by transmitting the illuminating light through the bowl-shaped frosted plate and the stray light produced when the illuminating light is transmitted through the bowl-shaped frosted plate is interrupted by the light interrupting cylinder 18, because of setting the light interrupting cylinder 18 or the like, the entire illuminating device will be complicated in the structure and will be costly and the loss of the light by interrupting the light will be large.

SUMMARY OF THE INVENTION

In view of the above mentioned problems, a primary object of the present invention is to provide an epidark illumination device wherein a flat epidark illumination can be made, a stray light can be prevented from entering an observing optical system and reducing the epidark effect and the entire device is simple in the formation and is low in the cost.

According to the present invention, this object is attained by epidark-illuminating an object to be inspected through an optical means whereby a light from a light source will be rightly reflected within an entrance plane including an optical axis but will be diffused within a plane vertical to the entrance plane.

According to a preferred formation of the present invention, the optical means comprises an annular reflecting member having many hairlines parallel with the optical axis and provided on the inside reflecting surface.

According to another preferred formation of the present invention, the optical means comprises an annular reflecting member finished on the inside reflecting surface as a mirror surface and a transparent ring plate member having on the surface many hairlines adjacently arranged concentrically with the annular reflecting member and radially extending from the center.

This and other objects of the present invention will become more apparent during the course of the following detailed description and appended claims.

DESCRIPTION OF THE PREFERRED EMBODIMENTS

Figure 1:
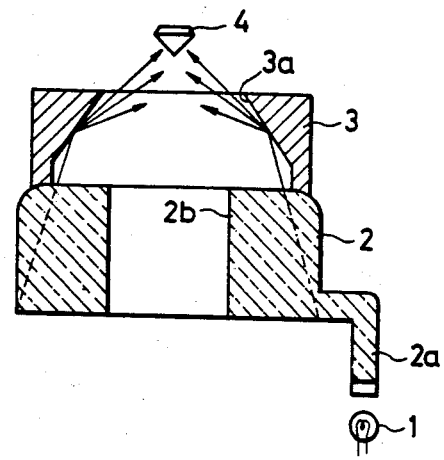
FIGS. 1 to 3 are respectively vertically sectioned views of conventional epidark illumination devices.
Figure 2:
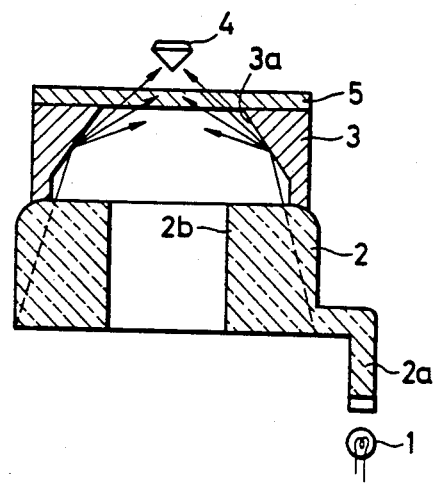
Figure 3:
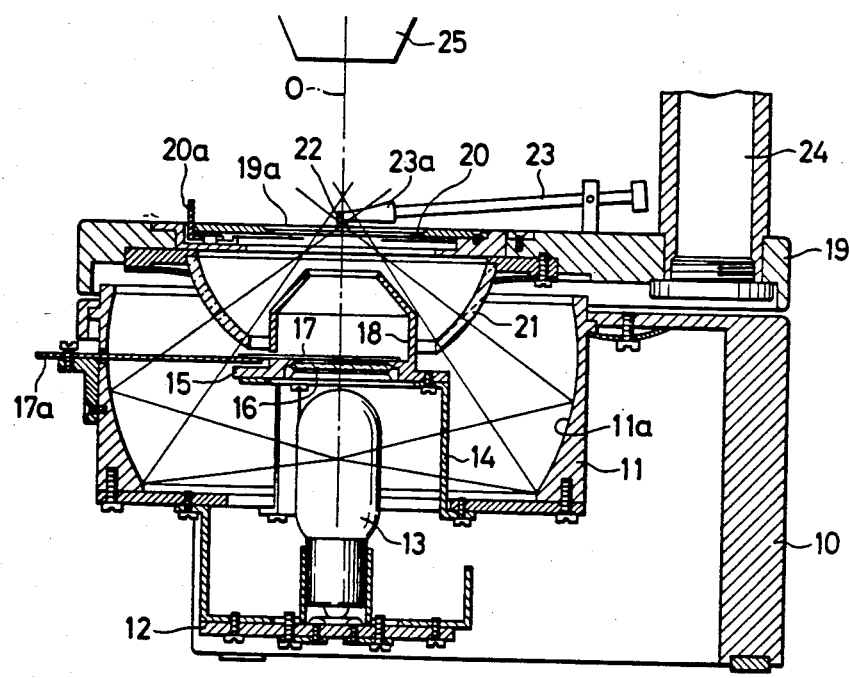
Figure 4:
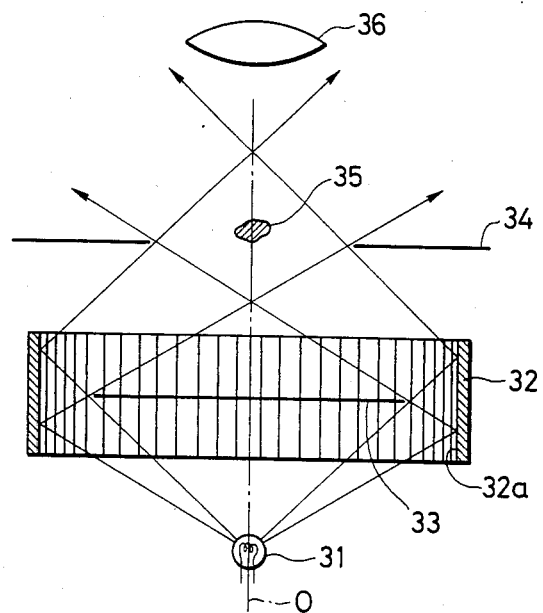
FIGS. 4 and 5 are respectively a vertically sectioned view and perspective view of a first embodiment of the epidark illumination device according to the present invention.
Figure 5:
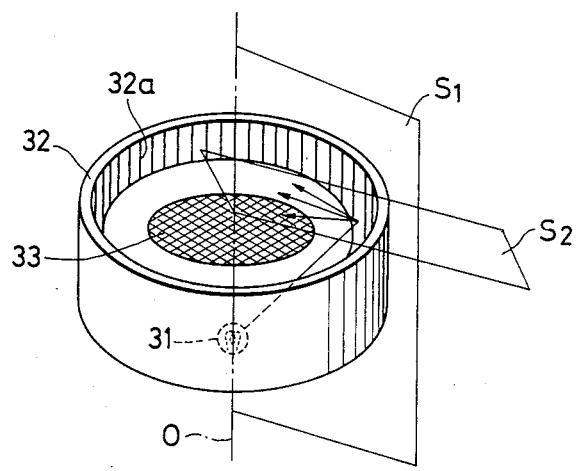

First of all, with reference to FIGS. 4 and 5, the reference numeral 31 denotes a light source, 32 denotes an annular reflecting member arranged concentrically with an optical axis O above the light source 31 and provided on the inside reflecting surface 32a with many hairlines parallel with the optical axis O, the inside reflecting surface 32a being so worked that the reflecting light from the light source 31 will be angularly reflected substantially without being diffused within an entrance plane $S_1$ including the optical axis but will be properly diffused within a plane $S_2$ including said angularly reflected light and parallel to said entrance plane $S_1$ and the visual field will be uniformally illuminated, 33 denotes a light interrupting disk arranged concentrically with the optical axis O inside the reflecting member 32 so that the light of the light source 31 may not directly enter a later described objective, 34 denotes an iris diaphragm arranged above the reflecting member 32, 35 denotes an object to be inspected and 36 denotes an objective of an observing system not illustrated.

Figure 6:
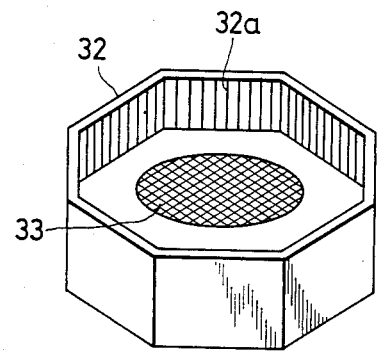
FIG. 6 is a perspective view showing a shape different from that in FIG. 6 of the optical means in the first embodiment.

As the epidark illumination device according to the present invention is formed as described above, the light having entered the inside reflecting surface 32a by avoiding the light interrupting disk 33 of the light emitted from the light source 31 will be reflected there, will be transmitted through a space limited by the light interrupting disk 33 and iris diaphragm 34 and will obliquely illuminate the object. In this case, the inside reflecting surface 32a will substantially angularly reflect the light from the light source 31 within the entrance plane $S_1$ including the optical axis O, therefore such stray light as will directly enter the objective due to the scrambling reflection from the reflecting surface will be harder to generate than from the conventional reflecting surface formed to be a rough surface and thus an epidark observation of a high performance will be possible without reducing the epidark effect. Further, the inside reflecting surface 32a will properly diffuse the light from the light source 31 to uniformly illuminate the field to be illuminated and to fill the field to be illuminated within the plane the entire device as described above and is low in the cost. By the way, it is needless to say that the shape of the reflecting member 32 may be polygonal as shown in FIG. 6.

Figure 7:
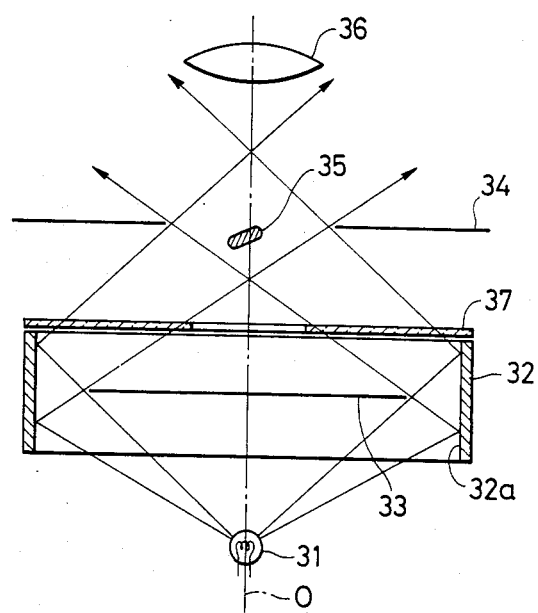
FIGS. 7 and 8 are respectively a vertically sectioned view and perspective view of a second embodiment of the epidark illumination device according to the present invention.
Figure 8:
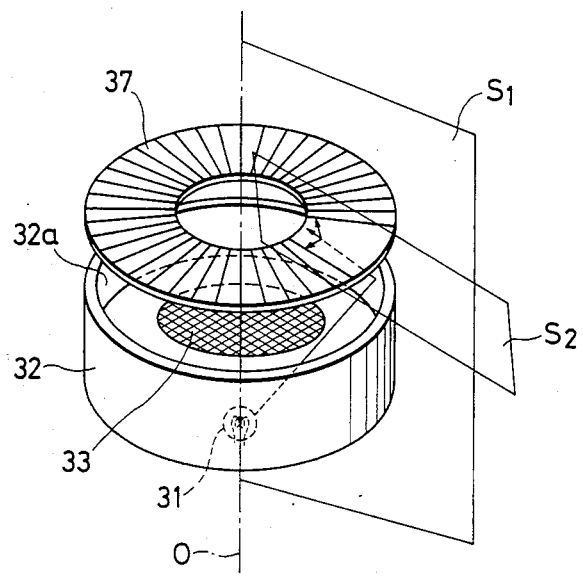
Figure 9:
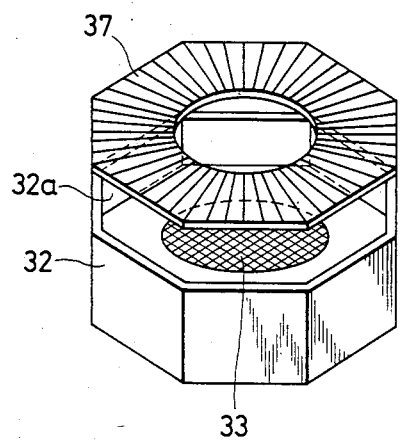
FIG. 9 is a perspective view showing a shape different from that in FIG. 8 of the optical means in the second embodiment.

FIGS. 7 and 8 show a second embodiment. In this embodiment, as different from the above mentioned embodiment, the inside reflecting surface 32a of the reflecting member 32 is formed of a mirror surface and such doughnut-shaped light transmissible member 37 transmitting the light $S_2$ including the above mentioned angularly reflected light and parallel to the entrance plane $S_1$, therefore the illuminating light will be prevented from collecting in the central part of the object 35 and producing an off-axis illumination, a uniform illumination will be made and the reflection on the ground surface of the object 35 will be able to be minimized. Also, the present epidark illumination device is very simple in the formation of as is within the entrance plane $S_1$ including the optical axis O but properly diffusing the light to uniformly fill the field to be illuminated within the plane $S_2$ including said transmitted light and vertical to the entrance plane as, for example, a glass plate having very large number of hairlines extending radially from the center is arranged between the reflecting member 32 and an object placing surface. Therefore, in this case, the light having entered the inside reflecting surface 32a by avoiding the light interrupting disk 33 of the light emitted from the light source 31 will be rightly reflected and then, in the light transmissible member 37, will be transmitted as it is within the entrance plane $S_1$ but will be diffused to flatly and uniformly illuminate the field to be illuminated within the plane $S_2$ and therefore the same effect as in the first embodiment will be obtained. By the way, the light transmissible member 37 is formed to be doughnut-shaped and is hollow inside and therefore will not enter the observing visual field. It is needless to say that the shapes of the reflecting member 32 and light transmissible member 37 may be polygonal as shown in FIG. 9.

Figure 10:
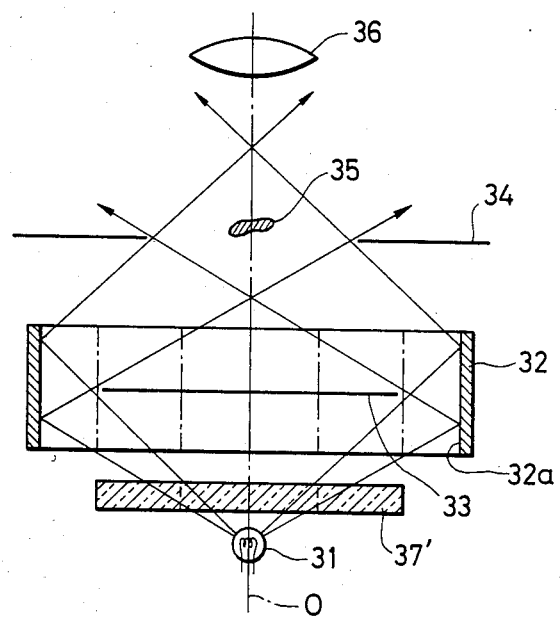
FIG. 10 is a vertically sectioned view showing a modification of the second embodiment.

FIG. 10 shows a modification of the second embodiment. Therein, a disk-shaped light transmissible member 37′ having the same optical characteristics as of the above mentioned light transmissible member 37 is arranged between the light source 31 and reflecting member 32 and the same effects as of the above mentioned first and second embodiments will be obtained. In this case, too, the reflecting member 32 and light transmissible member 37' may be polygonal as shown by the chain lines in FIG. 10.

What is claimed is:

1. An epidark illumination device comprising a light source arranged on an optial axis, an annular reflecting member having an interior annular reflecting surface on which are located a very large number of hairlines extending parallel with said optical axis whereby light from said light source is angularly reflected through an angle which lies in an entrance plane which passes through said optical axis but which is diffused in a plane which extends generally perpendicular to said entrance plane, and a light interrupting member arranged concentrically with said reflecting member within said reflecting member so as to prevent light from said light source from directly entering an objective whereby an epidark illumination of an object to be inspected is accomplished.

2. An epidark illumination device according to claim 1 further comprising an iris diaphragm arranged concentrically to said optical axis with said reflecting member near an object to be inspected so as to prevent the light from said light source from directly entering an objective.

3. An epidark illumination device comprising a light source arranged on an optical axis, an annular reflecting member having an interior polygonal in cross-section reflecting surface on which are located a very large number of hairlines extending parallel with said optical axis whereby light from said light source is angularly reflected through an angle which lies in an entrance plane which passes through said optical axis but which is diffused in a plane which extends generally perpendicular to said entrance plane, and a light interrupting member arranged concentrically with said reflecting member within said reflecting member so as to prevent light from said light source from directly entering an objective whereby an epidark illumination of an object to be inspected is accomplished.

4. An epidark illumination device comprising a light source arranged on an optical axis, an annular reflecting member having an interior polygonal in cross-section reflecting surface on which are located a very large number of hairlines extending parallel with said optical axis whereby light from said light source is angularly reflected through an angle which lies in an entrance plane which passes through said optical axis but which is diffused in a plane which extends generally perpendicular to said entrance plane, and a light interrupting member arranged concentrically with said reflecting member within said reflecting member so as to prevent light from said light source from directly entering an objective whereby an epidark illumination of an object to be inspected is accomplished, said device including optical means comprising an annular reflecting member finished on the inside reflecting surface thereof to be a mirror surface and a light transmissible plate-shaped member arranged concentrically with an adjacent to said reflecting member and provided on the surface with a large number of hairlines extending radially from the center, a light interrupting member arranged concentrically with said reflecting member within said reflecting member, and an iris diaphragm arranged concentrically with said reflecting member near an object to be inspected so as to prevent the light from said light source from directly entering an objective.

5. An epidark illumination device according to claim 4 wherein said plate-shaped member is arranged between said reflecting member and an object to be inspected.

6. An epidark illumination device according to claim 4 wherein said plate-shaped member is arranged between said light source and reflecting member.

7. An epidark illumination device according to claim 4 wherein said reflecting member is circular in the cross-section and said plate-shaped member is formed to be a circular ring.

8. An epidark illumination device according to claim 4 wherein said reflecting member is polygonal in the cross-section and said plate-shaped member is formed to be ring whose outer periphery forms a polygon similar to that of said reflecting member.

* * * * *